(12) United States Patent
Ahner et al.

(10) Patent No.: US 10,947,148 B2
(45) Date of Patent: Mar. 16, 2021

(54) LASER BEAM CUTTING/SHAPING A GLASS SUBSTRATE

(71) Applicant: Seagate Technology LLC, Cupertino, CA (US)

(72) Inventors: Joachim Walter Ahner, Livermore, CA (US); David Marcus Tung, Livermore, CA (US); Daniel T. Jennings, San Jose, CA (US); Robin Davies, Livermore, CA (US); Ian J. Beresford, Milpitas, CA (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 238 days.

(21) Appl. No.: 15/702,619

(22) Filed: Sep. 12, 2017

(65) Prior Publication Data

US 2019/0039173 A1    Feb. 7, 2019

Related U.S. Application Data

(60) Provisional application No. 62/542,232, filed on Aug. 7, 2017, provisional application No. 62/542,235, filed
(Continued)

(51) Int. Cl.
*B23K 26/064*    (2014.01)
*B23K 26/067*    (2006.01)
(Continued)

(52) U.S. Cl.
CPC .......... *C03B 33/102* (2013.01); *B23K 10/003* (2013.01); *B23K 26/0006* (2013.01); *B23K 26/064* (2015.10); *B23K 26/067* (2013.01); *B23K 26/0643* (2013.01); *B23K 26/0648* (2013.01); *B23K 26/0676* (2013.01); *B23K 26/0853* (2013.01); *B23K 26/3576* (2018.08);
(Continued)

(58) Field of Classification Search
CPC . C03B 33/102; C03B 33/0222; C03B 33/082; B23K 26/361; B23K 26/3576; B23K 10/003; B23K 26/064; B23K 26/0006; B23K 26/042; B23K 26/046; B23K 26/0648; B23K 26/067; B23K 26/0853; B23K 26/38; B23K 26/0643; B23K 2103/54; B23K 26/0676; B23K 26/402
See application file for complete search history.

(56) References Cited

U.S. PATENT DOCUMENTS 9,676,167 B2    6/2017  Marjanovic et al.
9,686,861 B2    6/2017  Ma et al.
(Continued)

*Primary Examiner* — Queenie S Dehghan
(74) *Attorney, Agent, or Firm* — Holzer Patel Drennan

(57) ABSTRACT

An apparatus includes a beam splitter and a plurality of mirrors. The beam splitter is positioned to receive a laser beam from a source and split the received laser beam to a first plurality of split laser beams and a second plurality of split laser beams. The plurality of mirrors is configured to direct the first plurality of split laser beams and further configured to direct the second plurality of split laser beams. The first plurality of split laser beams is directed by the plurality of mirrors is configured to cut a glass substrate. The second plurality of split laser beams is directed by the plurality of mirrors is configured to shape the glass substrate.

15 Claims, 15 Drawing Sheets

Related U.S. Application Data on Aug. 7, 2017, provisional application No. 62/542,216, filed on Aug. 7, 2017.

(51) Int. Cl.

| | | |
|---|---|---|
| *C03B 33/10* | (2006.01) | |
| *C03B 33/02* | (2006.01) | |
| *C03B 33/08* | (2006.01) | |
| *B23K 26/00* | (2014.01) | |
| *B23K 26/06* | (2014.01) | |
| *B23K 26/08* | (2014.01) | |
| *B23K 26/38* | (2014.01) | |
| *B23K 26/402* | (2014.01) | |
| *B23K 26/361* | (2014.01) | |
| *B23K 26/352* | (2014.01) | |
| *B23K 10/00* | (2006.01) | |
| *B23K 103/00* | (2006.01) | |

(52) U.S. Cl.
CPC ............ *B23K 26/361* (2015.10); *B23K 26/38* (2013.01); *B23K 26/402* (2013.01); *C03B 33/0222* (2013.01); *C03B 33/082* (2013.01); *B23K 2103/54* (2018.08)

(56) References Cited

U.S. PATENT DOCUMENTS

| | | | |
|---|---|---|---|
| 9,687,936 B2 | 6/2017 | Marjanovic et al. | |
| 9,707,658 B2 | 7/2017 | Darcangelo et al. | |
| 9,764,979 B2 | 9/2017 | Fujii et al. | |
| 10,384,306 B1* | 8/2019 | Beresford | B23K 26/103 |
| 2004/0251243 A1* | 12/2004 | Lizotte | B23K 26/067 219/121.73 |
| 2013/0091897 A1* | 4/2013 | Fujii | C03B 33/0222 65/112 |
| 2014/0340730 A1* | 11/2014 | Bergh | B23K 26/38 359/275 |
| 2016/0016257 A1* | 1/2016 | Hosseini | B23K 26/0648 65/112 |
| 2017/0203994 A1* | 7/2017 | Chen | C03B 33/093 |

* cited by examiner

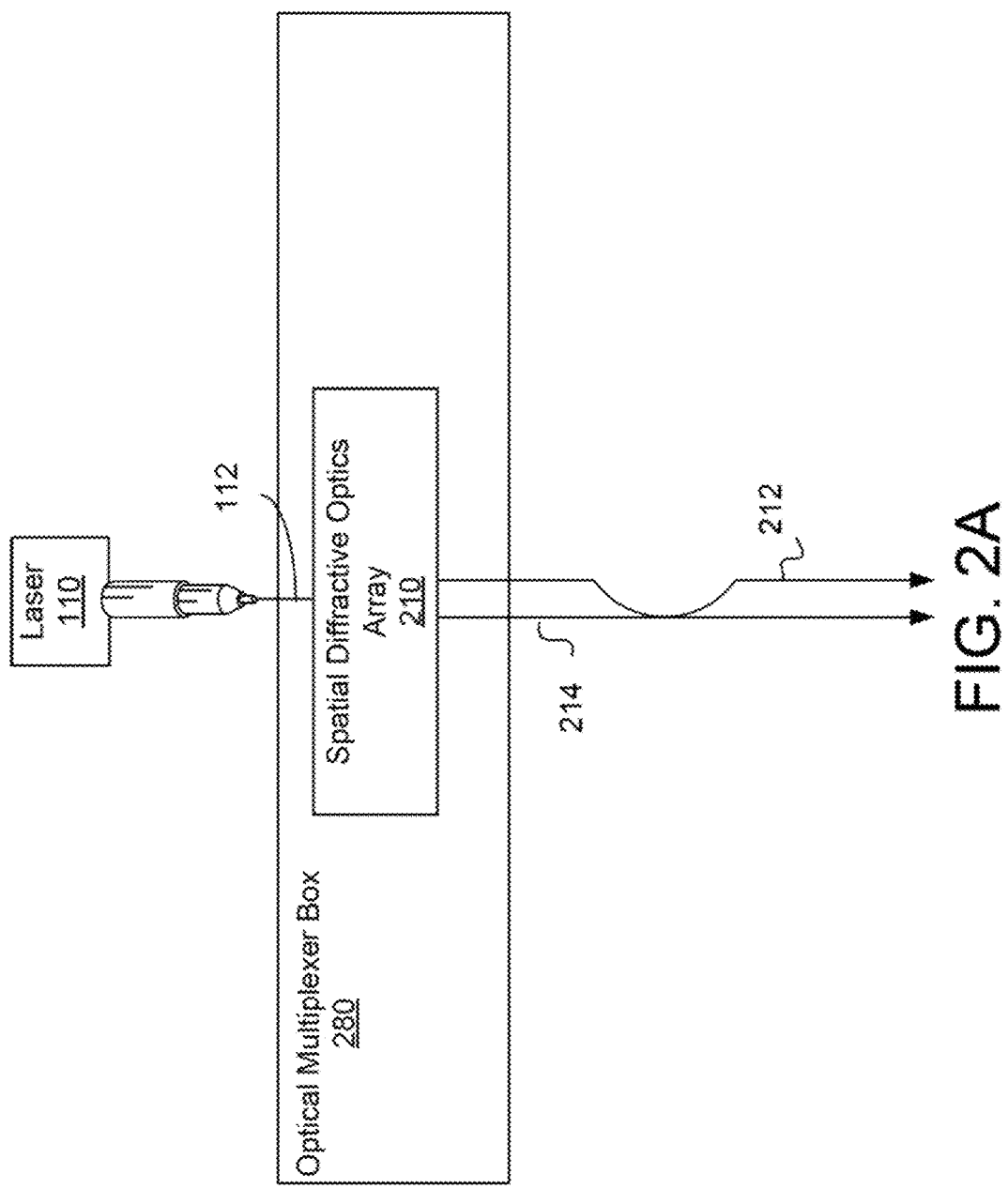

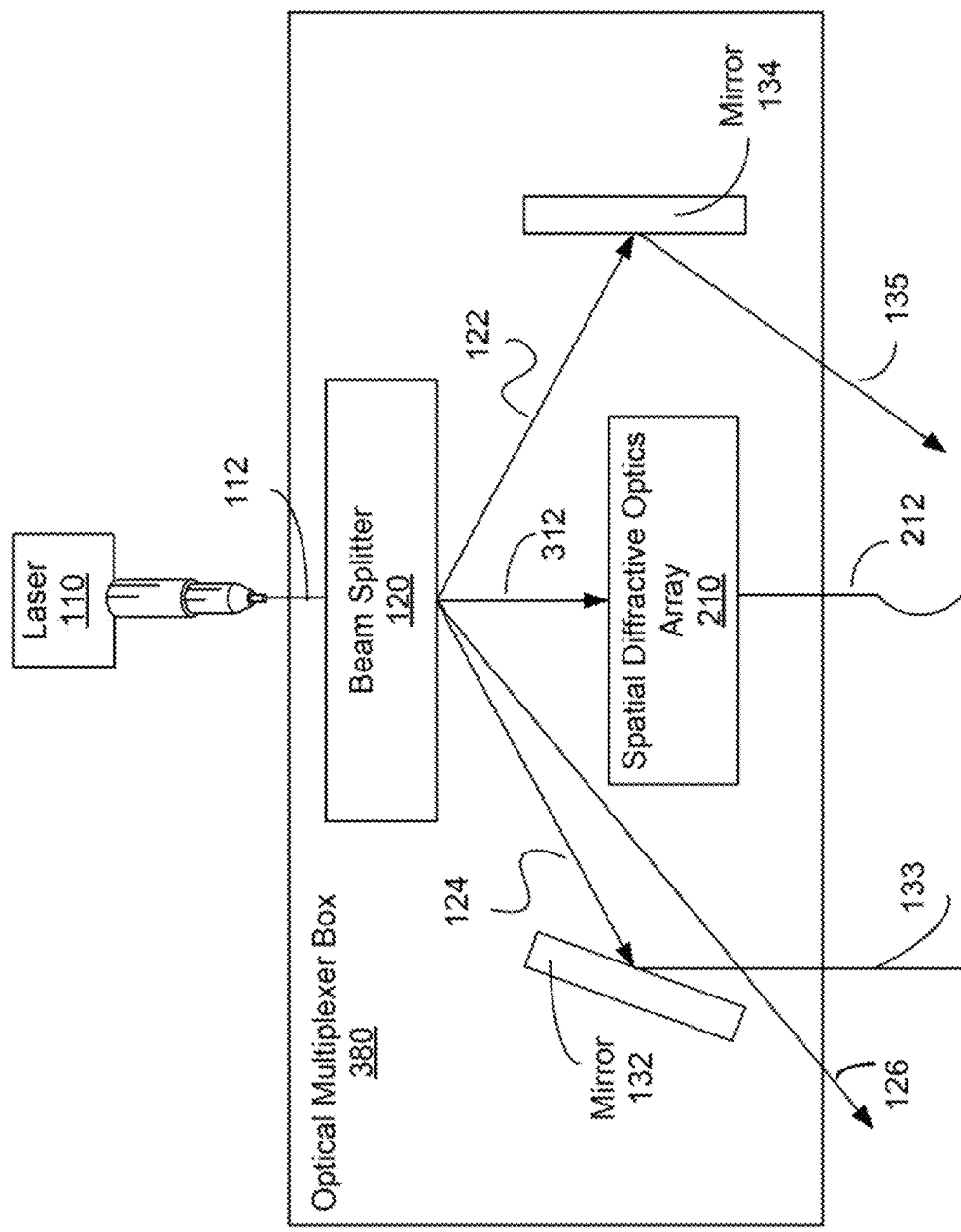

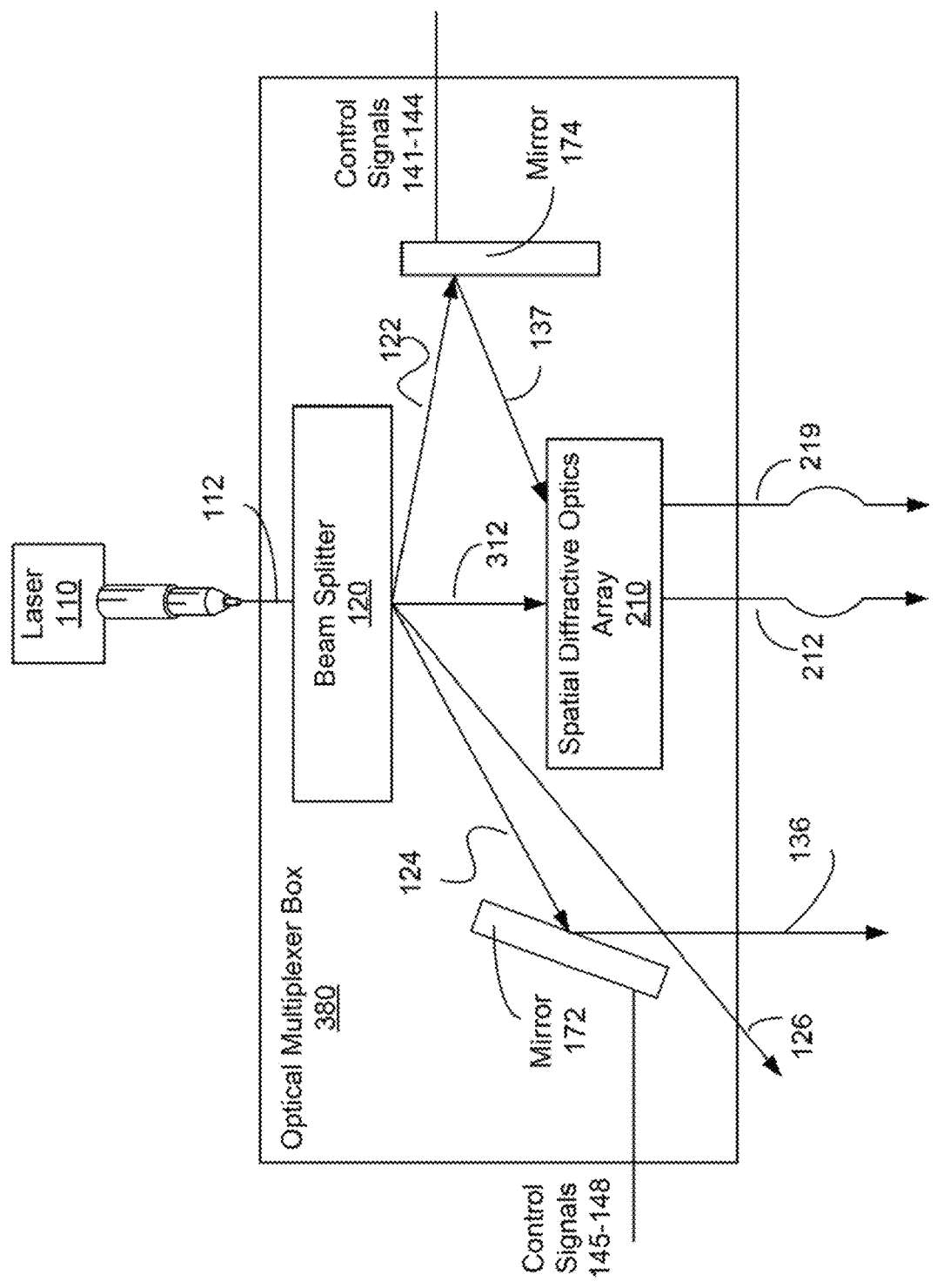

LASER BEAM CUTTING/SHAPING A GLASS SUBSTRATE

RELATED APPLICATIONS

This application claims the benefit and priority to the U.S. Provisional Patent Application No. 62/542,216, filed on Aug. 7, 2017, U.S. Provisional Patent Application No. 62/542,232, filed on Aug. 7, 2017, and U.S. Provisional Patent Application No. 62/542,235, filed on Aug. 7, 2017, which are incorporated by reference herein in their entirety.

SUMMARY

Provided herein is an apparatus that includes a beam splitter and a plurality of mirrors. The beam splitter is positioned to receive a laser beam from a source and split the received laser beam to a first plurality of split laser beams and a second plurality of split laser beams. The plurality of mirrors is configured to direct the first plurality of split laser beams and further configured to direct the second plurality of split laser beams. The first plurality of split laser beams is directed by the plurality of mirrors is configured to cut a glass substrate. The second plurality of split laser beams is directed by the plurality of mirrors is configured to shape the glass substrate.

These and other features and advantages will be apparent from a reading of the following detailed description.

BRIEF DESCRIPTION OF DRAWINGS

FIGS. 2A-2B show a system including a spatial diffractive optics array configured to cut and shape a glass substrate according to one aspect of the present embodiments.

FIGS. 3A-3F shows a system including an optical multiplexer box configured to cut and shape a glass substrate according to one aspect of the present embodiments.

DESCRIPTION

Figure 1A:
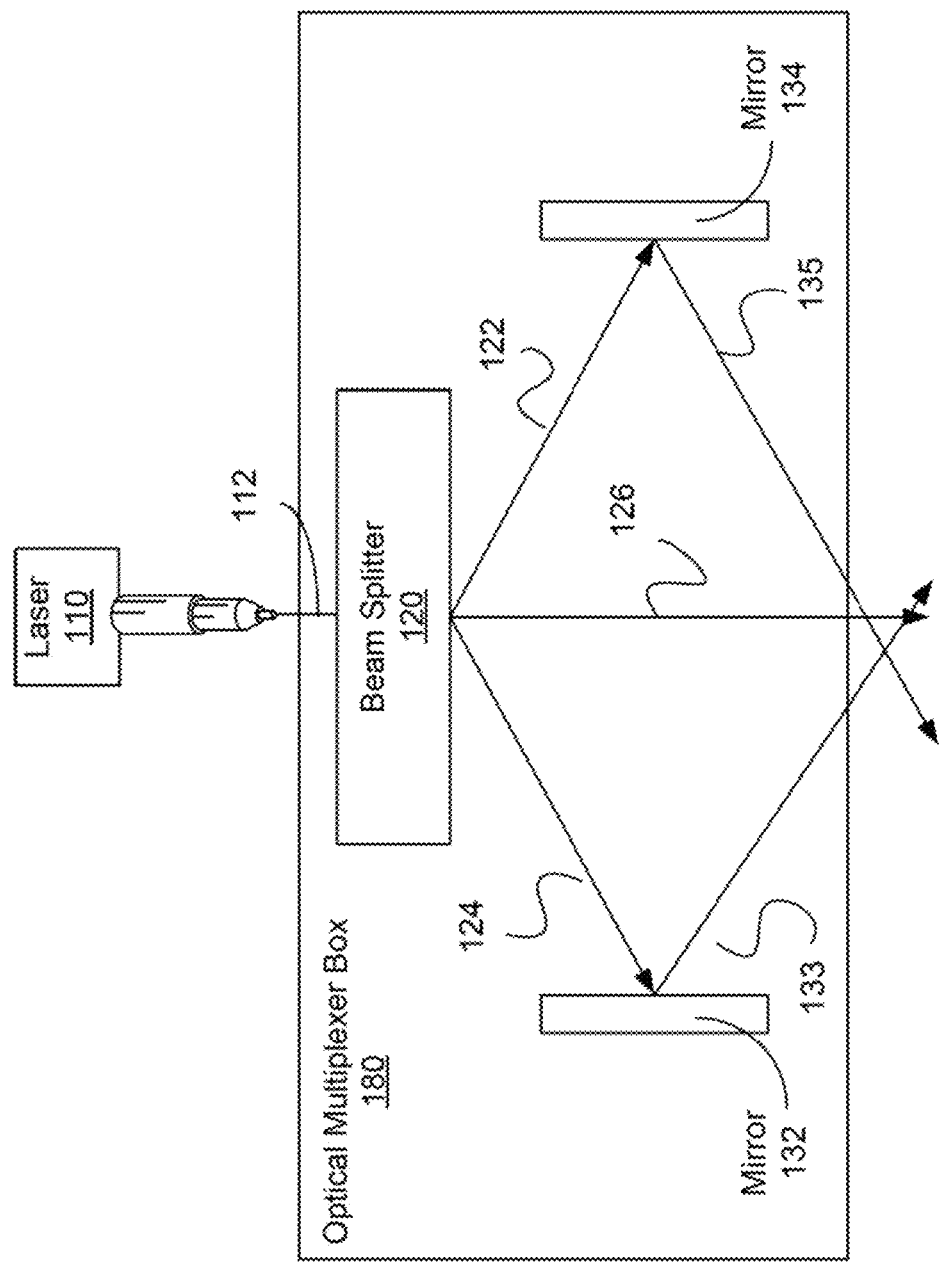
FIGS. 1A-1E show a system configured to cut and shape a glass substrate according to one aspect of the present embodiments.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "middle," "bottom," "beside," "forward," "reverse," "overlying," "underlying," "up," "down," or other similar terms such as "upper," "lower," "above," "below," "under," "between," "over," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

As the technology of magnetic recording media reaches maturity, it becomes increasingly difficult to continue to increase the storage capacity of recording media (e.g. disk drive disks) or to reduce the size of recording media while maintaining storage capacity. Such challenges may be overcome by increasing the bit density on the recording media. New technology such as Heat Assisted Magnetic Recording (HAMR) in disk drives has offered higher areal density as well as backward compatibility and enhanced data retention. A glass substrate has been used in HAMR technology consistent with thermal transfer properties of the HAMR writing process. Similarly, perpendicular media recording (PMR) technology in disk drive may benefit from using a glass substrate because a glass substrate has modulus and density similar to that of aluminum used in most cloud storage products.

Reducing the glass substrate thickness increases disk packing density, thereby increasing the drive capacity. In order to increase the drive capacity, the glass substrates used in HAMR and PMR have stringent surface roughness with tight dimensional precision. Unfortunately, the glass substrates are mechanically cut and grinded, causing fracturing and other surface anomalies. Moreover, mechanically cutting the glass substrate results in large dimensional errors, which require subsequent edging to bring the glass substrate within the final tolerances. Furthermore, subsequent grinding is not only costly but also time consuming, thereby adversely impacting the throughput.

Accordingly, a need has arisen to avoid mechanical cutting and grinding of the glass substrate in technologies with stringent surface roughness and tight dimensional precision such as PMR and HAMR. In some embodiments, an apparatus cuts and shapes the glass substrate in a non-mechanical fashion. In some embodiments, laser technology is used to simultaneously cut and shape a glass substrate. For example, the apparatus may include a beam splitter and a plurality of mirrors. The beam splitter is positioned to receive a laser beam from a source and split the received laser beam to a first plurality of split laser beams and a second plurality of split laser beams. The plurality of mirrors is configured to direct the first plurality of split laser beams and further configured to direct the second plurality of split laser beams. The first plurality of split laser beams directed by the plurality of mirrors is configured to cut a glass substrate. The second plurality of split laser beams directed by the plurality of mirrors is configured to shape the glass substrate. It is appreciated that the apparatus may further include a spatial diffractive optics array configured to receive a laser beam from the source, or from the plurality of mirrors, or from the beam splitter. The spatial diffractive optics array is configured to bend the received laser beam that shapes the glass substrate. It is appreciated that in some embodiments, the spatial diffractive optics array is configured to cut the glass substrate.

Referring now to FIGS. 1A-1E, a system configured to cut and shape a glass substrate according to one aspect of the present embodiments is shown. More specifically, referring to FIG. 1A, a system 100A is shown. The system 100A includes a laser source 110 and an optical multiplexer box 180. The laser source 110 is configured to generate one or more laser beams, e.g., laser beam 112, that are received by the optical multiplexer box 180. The optical multiplexer box 180 is positioned to manipulate the received laser beam to generate a modified laser beam(s), e.g., laser beams 126, 133, and 135. The modified laser beam(s) is emitted onto a glass substrate. The modified laser beam(s) cuts and/or shapes the glass substrate. In some embodiments, the glass substrate is cut and shaped simultaneously. It is appreciated that references made to the laser beam being modified is a reference to one or more of the angle (e.g., incident/reflection/diffraction/refraction) of the laser beam changing, the coherency of the laser beam changing, the polarization of the laser beam changing, the magnitude of the laser beam changing, the wavelength of the laser beam changing, the intensity of the laser beam changing, the spot diameter of the laser beam changing, the pulse duration of the laser beam changing, the pulse shape of the laser beam changing, etc.

In some embodiments, the optical multiplexer box 180 includes a beam splitter 120, and a plurality of mirrors, e.g., mirrors 132 and 134. The beam splitter 120 is positioned to receive the laser beam 112 from the laser source 110. The beam splitter 120 is configured to split the received laser beam 112 into more than one laser beam, e.g., laser beams 122, 124, and 126. It is appreciated that some of the split laser beams may be directed using the mirrors 132 and 134. For example, split laser beams 122 and 124 are emitted onto the mirrors 132 and 134 respectively at their respective incident angle. It is appreciated that the incident angles for the split laser beams 122 and 124 may or may not be the same. The mirrors 132 and 134 therefore reflect the split laser beams 122 and 124 at their respective angle of reflection, e.g., reflected laser beams 133 and 135. It is appreciated that some split laser beam(s) may not be directed using mirrors, e.g., split laser beam 126. It is appreciated that the positioning of the mirrors 132 and/or 134 may be fixed or it may be modifiable, e.g., one or more mirrors may be rotated to change the angle of incident and the angle of reflection.

The laser beams 126, 133 and 135 may be emitted from the optical multiplexer box 180 onto the glass substrate. As such, the glass substrate may be cut and shaped through means other than mechanical cutting and shaping. In some embodiments, the laser beams 126, 133, and 135 may cut and shape the glass substrate simultaneously.

It is appreciated that a component, e.g., diffractive optics, micro-lens arrays, spatial light modulator (SLM) for phase, wave front, and polarization control over the transverse direction of the laser, highly silvered mirrors on a linear piezo stage, pitch and yaw rotation stage, beam expander, beam compression, pulse stretching device, pulse shortening device, polarizing filter, polarizing rotator, photo-detector, beam shaping device (without shortening/stretching the pulse), fiber optic couplers, etc., may be positioned prior to or after the beam splitter 120 receiving the laser beam in order to modify the received laser beam, e.g., changing the coherency of the laser beam, changing the polarization of the laser beam, changing the magnitude of the laser beam, changing the wavelength of the laser beam, changing the intensity of the laser beam, changing the spot diameter of the laser beam, changing the pulse duration of the laser beam, changing the pulse shape of the laser beam, etc. It is similarly appreciated that a component may be positioned prior to or after the mirrors 132 and/or 134 receiving the split laser beams from the beam splitter 120 in order to modify the split laser beam, e.g., changing the coherency of the laser beam, changing the polarization of the laser beam, changing the magnitude of the laser beam, changing the wavelength of the laser beam, changing the intensity of the laser beam, changing the spot diameter of the laser beam, changing the pulse duration of the laser beam, changing the pulse shape of the laser beam, etc.

Figure 1B:
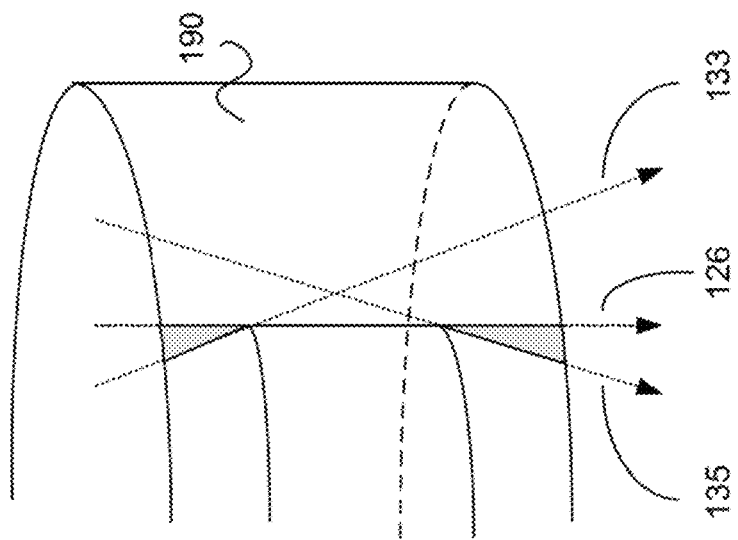

Referring now to FIG. 1B, a glass substrate 190 being cut/shaped is shown, as discussed in FIG. 1A. The modified laser beams, e.g., laser beams 126, 133, and/or 135, cut/shape the glass substrate 190 simultaneously in some embodiments. It is appreciated that in some embodiments, the cutting and shaping may occur sequentially but shortly after one another.

Figure 1C:
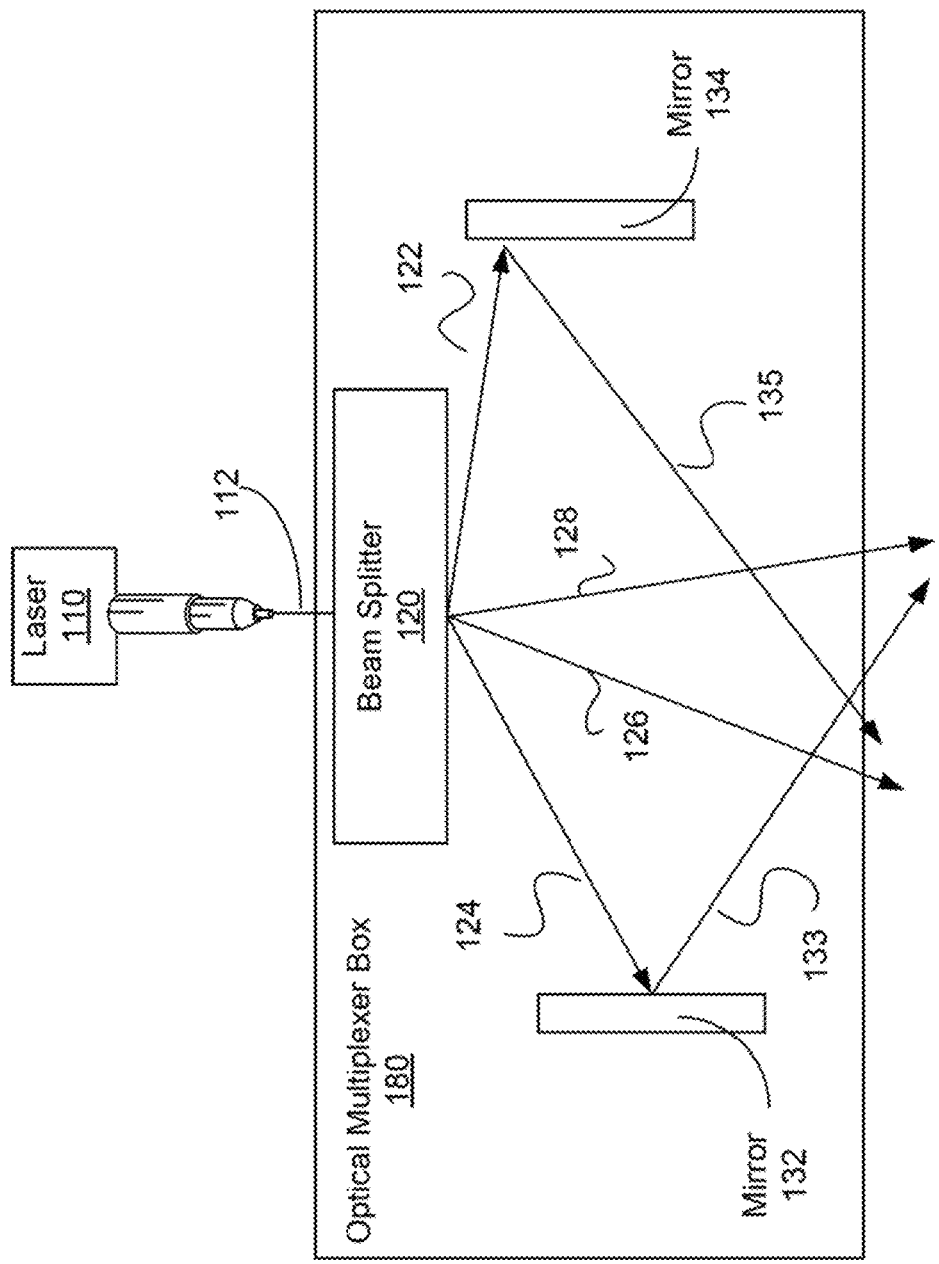

Referring now to FIG. 1C, a system 100C substantially similar to that of FIG. 1A is shown. In this embodiment, the beam splitter 120 split the received laser beams into four split laser beams, e.g., laser beams 122, 124, 126, and 128. Split laser beams 126 and 128 are emitted onto the glass substrate directly without being directed by a mirror.

Figure 1D:
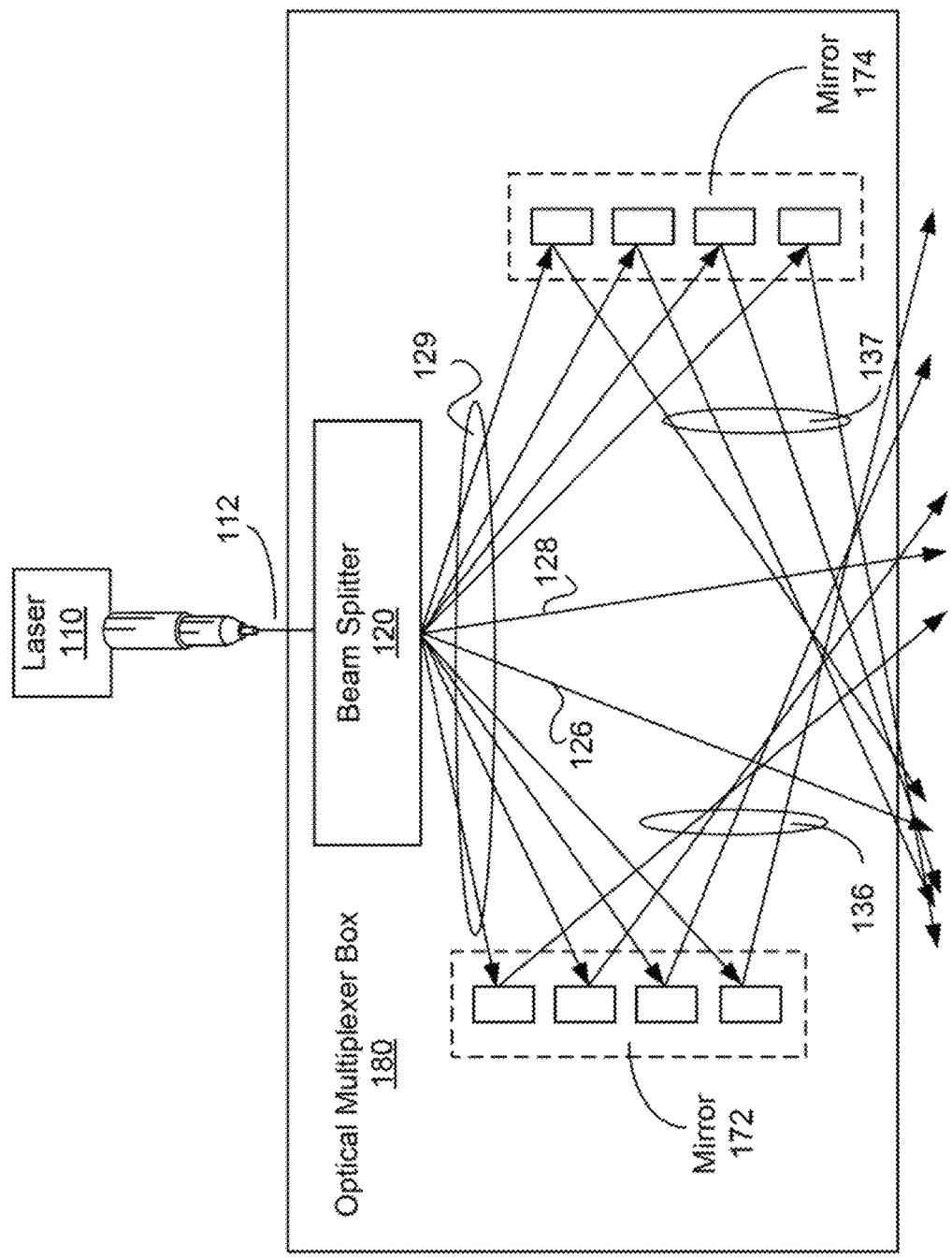

Referring now to FIG. 1D, a system 100D substantially similar to that of FIG. 1C is shown. In this embodiment, the beam splitter 120 splits the received laser beams into a plurality of split laser beams 129. Moreover, the mirror 134 is replaced with a mirror 174 that has a plurality of mirrors. Similarly, the mirror 132 is replaced with a mirror 172 that includes a plurality of mirrors. The mirror 172 receives a subset of the split laser beams and reflects a number of reflected split laser beams 136. Similarly, the mirror 174 receives a subset of the split laser beams and reflects a number of reflected split laser beams 137. Some of the split laser beams, e.g., 126 and 128, may be emitted from the beam splitter 120 without being directed by a mirror. The split laser beams either being emitted from the beam splitter 120 and/or reflected from the mirrors are emitted from the optical multiplexer box 180, thereby cutting and/or shaping the glass substrate.

Figure 1E:
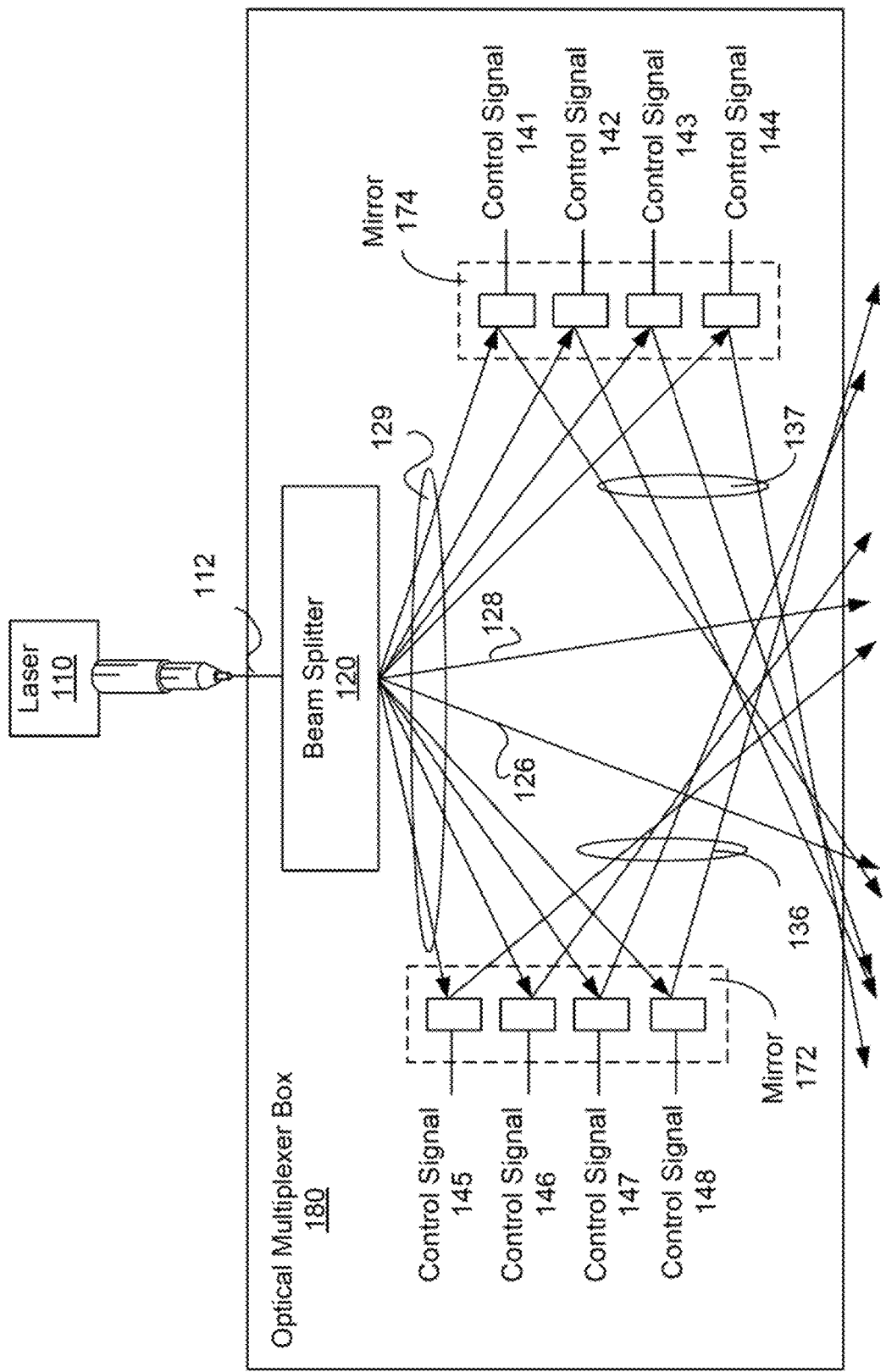

Referring now to FIG. 1E, a system 100E substantially similar to that of FIG. 1D is shown. In this embodiment, the mirrors 174 and 172 may be controlled using control signals 141-148. For example, the control signal 141 may control a mirror within the mirror 174 to move, therefore changing the angle of incident and as result changing the angle of reflection. Other mirrors may similarly be controlled. In some embodiments, the mirrors are controlled using the control signal using a microelectrical component, e.g., a microelectro mechanical device, piezo electric components, etc. to change their position in order to control the angle of incident and reflection.

Figure 2B:
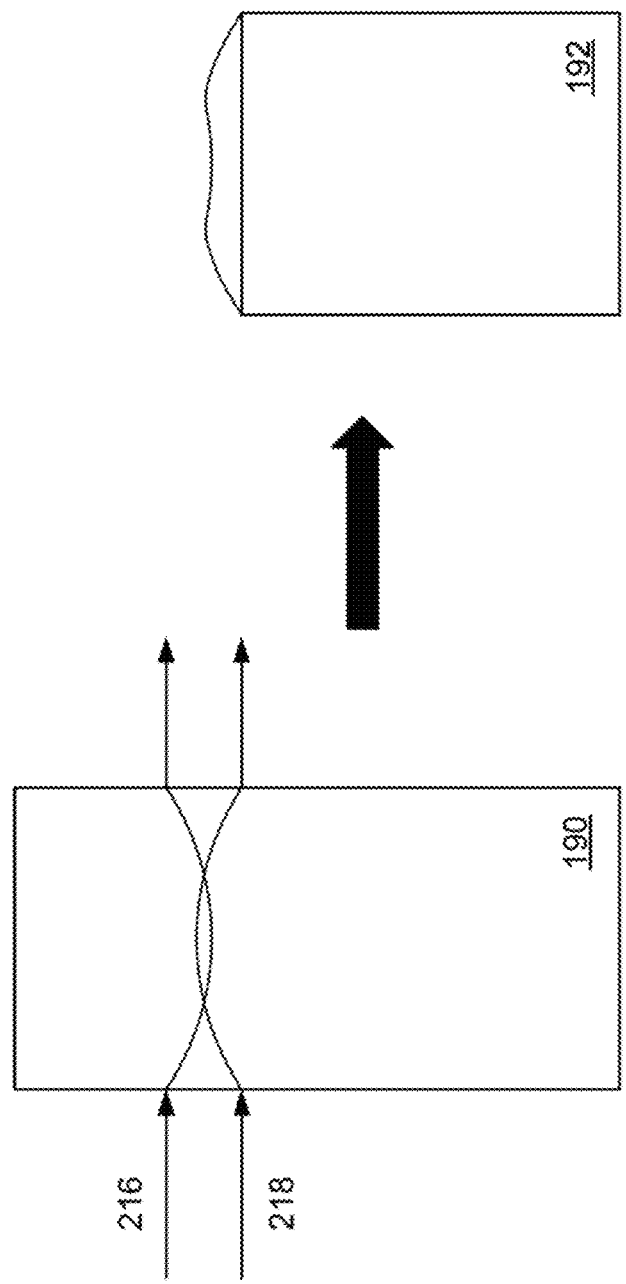

Referring now to FIGS. 2A-2B, a system including a spatial diffractive optics array configured to cut and shape a glass substrate according to one aspect of the present embodiments is shown. FIG. 2A shows a system 200A. The system 200A includes a laser source 110 and an optical multiplexer box 280. The laser source 110 is configured to generate one or more laser beams, e.g., laser beam 112, that are received by the optical multiplexer box 280. The optical multiplexer box 280 is positioned to manipulate the received laser beam to generate a modified laser beam(s). The modified laser beam(s) is emitted onto a glass substrate. The modified laser beam(s) cuts and/or shapes the glass substrate. In some embodiments, the glass substrate is cut and shaped simultaneously. It is appreciated that references made to the laser beam being modified is a reference to the angle (e.g., incident/reflection/diffraction/refraction) of the laser beam changing, the coherency of the laser beam changing, the polarization of the laser beam changing, the magnitude of the laser beam changing, the wavelength of the laser beam changing, the intensity of the laser beam changing, the spot diameter of the laser beam changing, the pulse duration of the laser beam changing, the pulse shape of the laser beam changing, etc.

In some embodiments, the optical multiplexer box 280 includes a spatial diffractive optics array 210. The spatial diffractive optics array 210 may bend the received laser beam 112, e.g., laser beam 212. It is appreciated that in some embodiments, the spatial diffractive optics array 210 may be configured to transmit the received laser beam 112 without bending it, e.g., laser beam 214. The laser beams 212 and 214 output from the optical multiplexer box 280 may cut and/or shape the substrate glass. It is appreciated that in some embodiments, the laser beams 212 and 214 may cut and shape the substrate glass simultaneously. In some embodiments, the spatial diffractive optics array 210 may include a Gaussian diffractive optics, a Bessel diffractive optics, an Airy diffractive optics, or any combination thereof.

Referring now to FIG. 2B, the glass substrate 190 may be cut using two bended laser beams 216 and 218. The glass substrate 190 once cut and shaped is shown as the glass substrate 192.

Figure 3B:
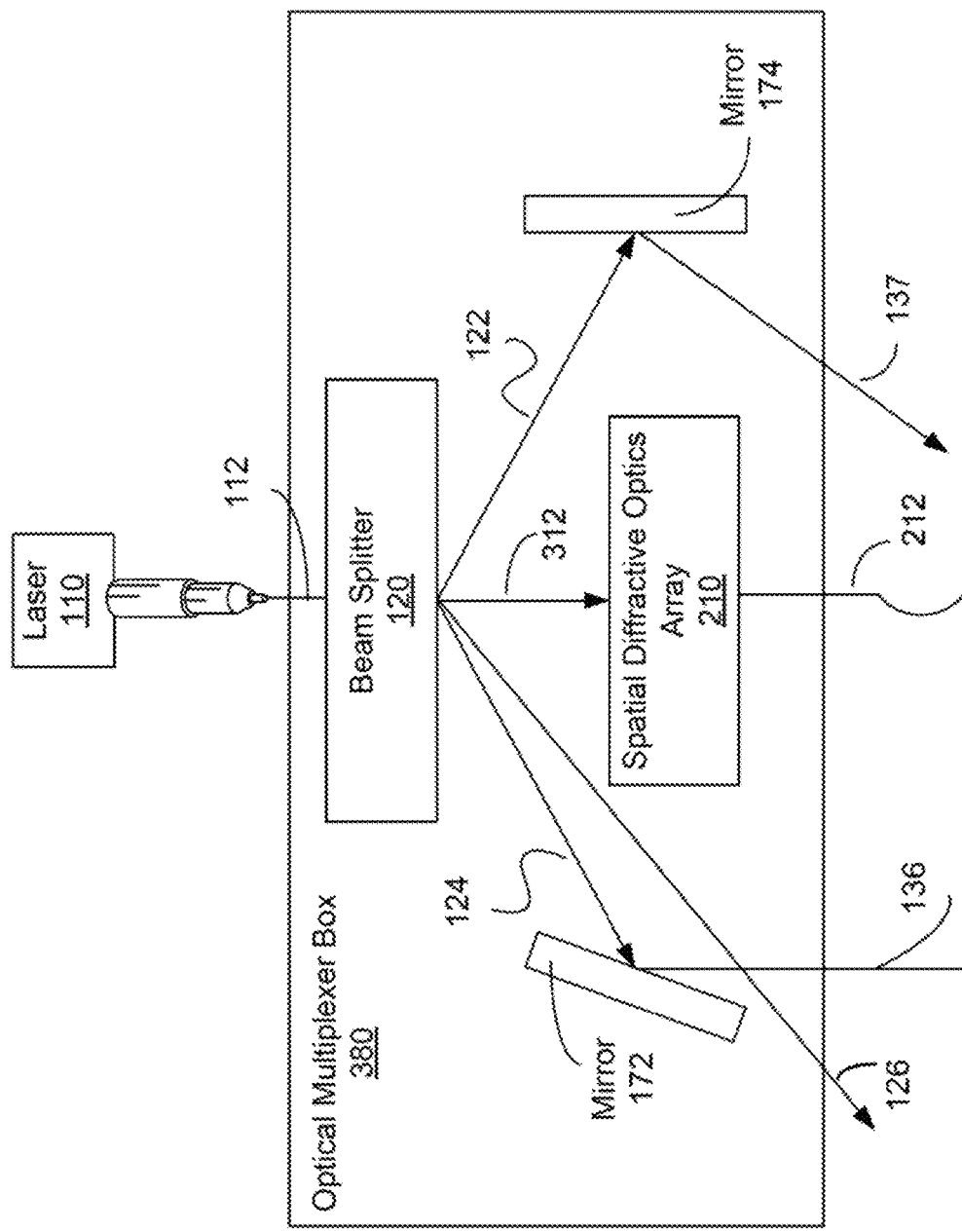

Referring now to FIGS. 3A-3F, a system including an optical multiplexer box configured to cut and shape a glass substrate according to one aspect of the present embodiments is shown. Referring more specifically to FIG. 3A, a combination of FIGS. 1A and 2A is shown. System 300A includes a laser source 110 and an optical multiplexer box 380. The laser source 110 is configured to generate one or more laser beams, e.g., laser beam 112, that are received by the optical multiplexer box 380. The optical multiplexer box 380 is positioned to manipulate the received laser beam(s) to generate a modified laser beam(s), e.g., laser beams 126, 133, 212, and 135. The modified laser beam(s) is emitted onto a glass substrate. The modified laser beam(s) cuts and/or shapes the glass substrate. In some embodiments, the glass substrate is cut and shaped simultaneously. It is appreciated that references made to the laser beam being modified is a reference to the angle (e.g., incident/reflection/diffraction/refraction) of the laser beam changing, the coherency of the laser beam changing, the polarization of the laser beam changing, the magnitude of the laser beam changing, the wavelength of the laser beam changing, the intensity of the laser beam changing, the spot diameter of the laser beam changing, the pulse duration of the laser beam changing, the pulse shape of the laser beam changing, etc.

The optical multiplexer box 380 includes a beam splitter 120, a spatial diffractive optics array 210, and a plurality of mirrors, e.g., mirrors 132 and 134. The beam splitter 120 is positioned to receive the laser beam 112 from the laser source 110. The beam splitter 120 is configured to split the received laser beam 112 into more than one laser beam, e.g., laser beams 122, 124, 126, and 312. It is appreciated that some of the split laser beams may be directed using the mirrors 132 and 134. For example, split laser beams 122 and 124 are emitted onto the mirrors 132 and 134 respectively at their respective incident angle. It is appreciated that the incident angles for the split laser beams 122 and 124 may or may not be the same. The mirrors 132 and 134 therefore reflect the split laser beams 122 and 124 at their respective angle of reflection, e.g., reflected laser beams 133 and 135. It is appreciated that some split laser beam(s) may not be directed using mirrors, e.g., split laser beam 126. It is appreciated that the positioning of the mirrors 132 and/or 134 may be fixed or it may be modifiable, e.g., one or more mirrors may be rotated to change the angle of incident and the angle of reflection.

The split laser beam 312 is emitted from the beam splitter 120 to the spatial diffractive optics array 210. The diffractive optics array 210 may bend the received split laser beam 312 to generate a bent laser beam 212.

The laser beams 126, 133, 135, and 212 may be emitted from the optical multiplexer box 380 onto the glass substrate. As such, the glass substrate may be cut and shaped through means other than mechanical cutting and shaping. In some embodiments, the laser beams 126, 133, 135, and 212 may cut and shape the glass substrate simultaneously.

It is appreciated that a component, e.g., diffractive optics, micro-lens arrays, spatial light modulator (SLM) for phase, wave front, and polarization control over the transverse direction of the laser, highly silvered mirrors on a linear piezo stage, pitch and yaw rotation stage, beam expander, beam compression, pulse stretching device, pulse shortening device, polarizing filter, polarizing rotator, photo-detector, beam shaping device (without shortening/stretching the pulse), fiber optic couplers, etc., may be positioned prior to or after the beam splitter 120 receiving the laser beam in order to modify the received laser beam, e.g., changing the coherency of the laser beam, changing the polarization of the laser beam, changing the magnitude of the laser beam, changing the wavelength of the laser beam, changing the intensity of the laser beam, changing the spot diameter of the laser beam, changing the pulse duration of the laser beam, changing the pulse shape of the laser beam, etc. It is similarly appreciated that a component may be positioned prior to or after the mirrors 132 and/or 134 receiving the split laser beams from the beam splitter 120 in order to modify the split laser beam, e.g., changing the coherency of the laser beam, changing the polarization of the laser beam, changing the magnitude of the laser beam, changing the wavelength of the laser beam, changing the intensity of the laser beam, changing the spot diameter of the laser beam, changing the pulse duration of the laser beam, changing the pulse shape of the laser beam, etc. Moreover, it is appreciated that a component may be positioned prior to or after the spatial diffractive optics array 210 receiving the split laser beams from the beam splitter 120 in order to modify the split laser beam, e.g., changing the coherency of the laser beam, changing the polarization of the laser beam, changing the magnitude of the laser beam, changing the wavelength of the laser beam, changing the intensity of the laser beam, changing the spot diameter of the laser beam, changing the pulse duration of the laser beam, changing the pulse shape of the laser beam, etc.

Referring now to FIG. 3B, system 300B is shown that operates substantially similar to that of FIG. 3A. In this embodiment, the mirrors 132 and 134 are replaced with a plurality of mirrors 172 and 174, similar to system 100D discussed in FIG. 1D.

Figure 3C:
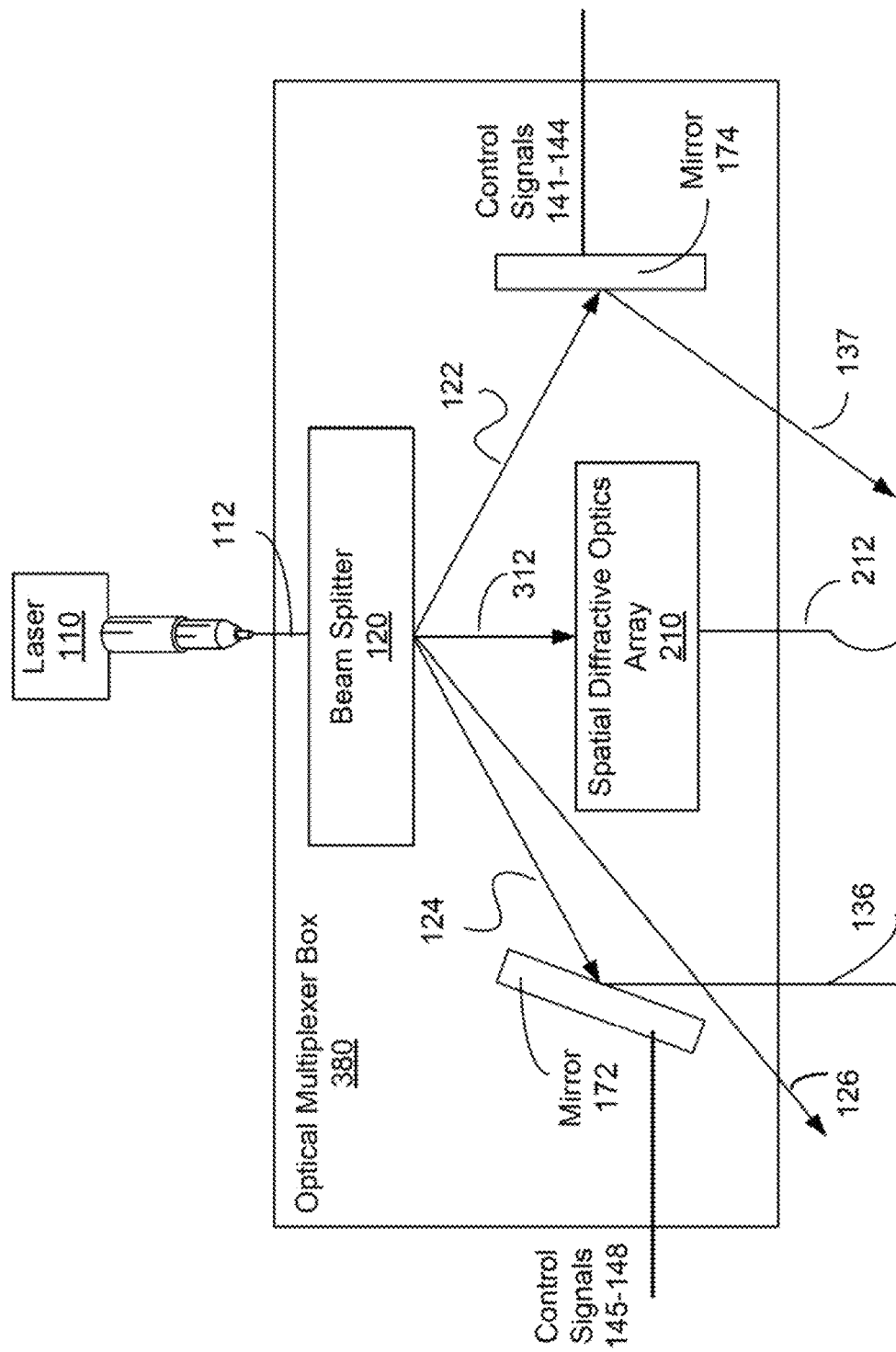

Referring now to FIG. 3C, system 300C is shown that operates substantially similar to that of FIG. 3B. In this embodiment, the mirrors 174 and 172 may be controlled using the control signals 141-148, similar to system 100E discussed in FIG. 1E.

Figure 3D:
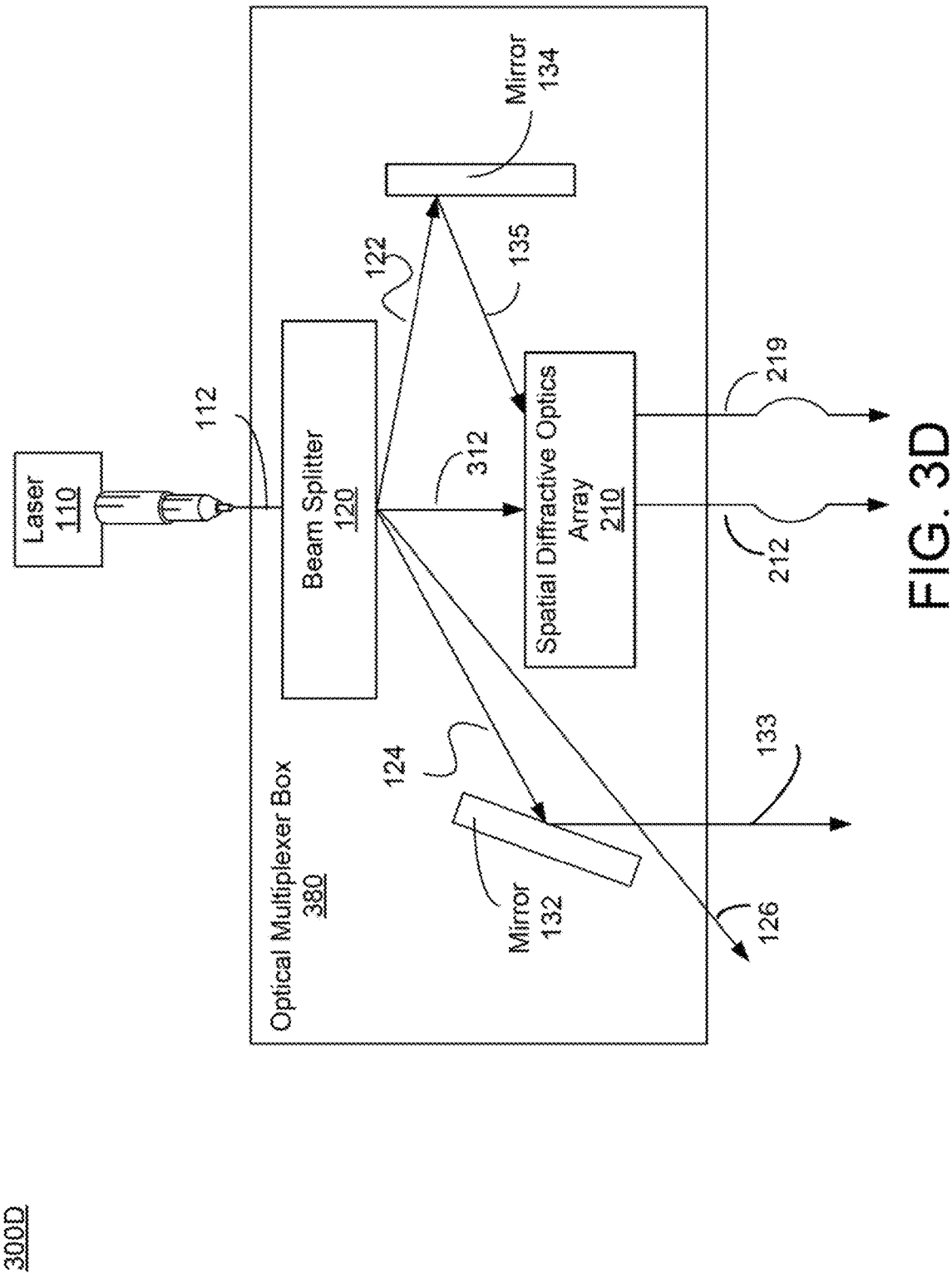

Referring now to FIG. 3D, system 300D is shown that operates substantially similar to that of FIG. 3A. In this embodiment, the mirror 134 emits the reflected laser beam 135 to the spatial diffractive optics array 210 instead of emitting it onto the glass substrate. Thus, the reflected laser beam 135 may be bent using the spatial diffractive optics array 210. The spatial diffractive optics array 210 may bend the reflected laser beam 135 and output the bent laser beam 219 onto the glass substrate. Thus, the optical multiplexer box 380 may output laser beams 126, 133, 212, and 219 to cut and/or shape the glass substrate. In some embodiments, the optical multiplexer box 380 may output laser beams 126, 133, 212, and 219 to cut and shape the glass substrate simultaneously.

Figure 3E:
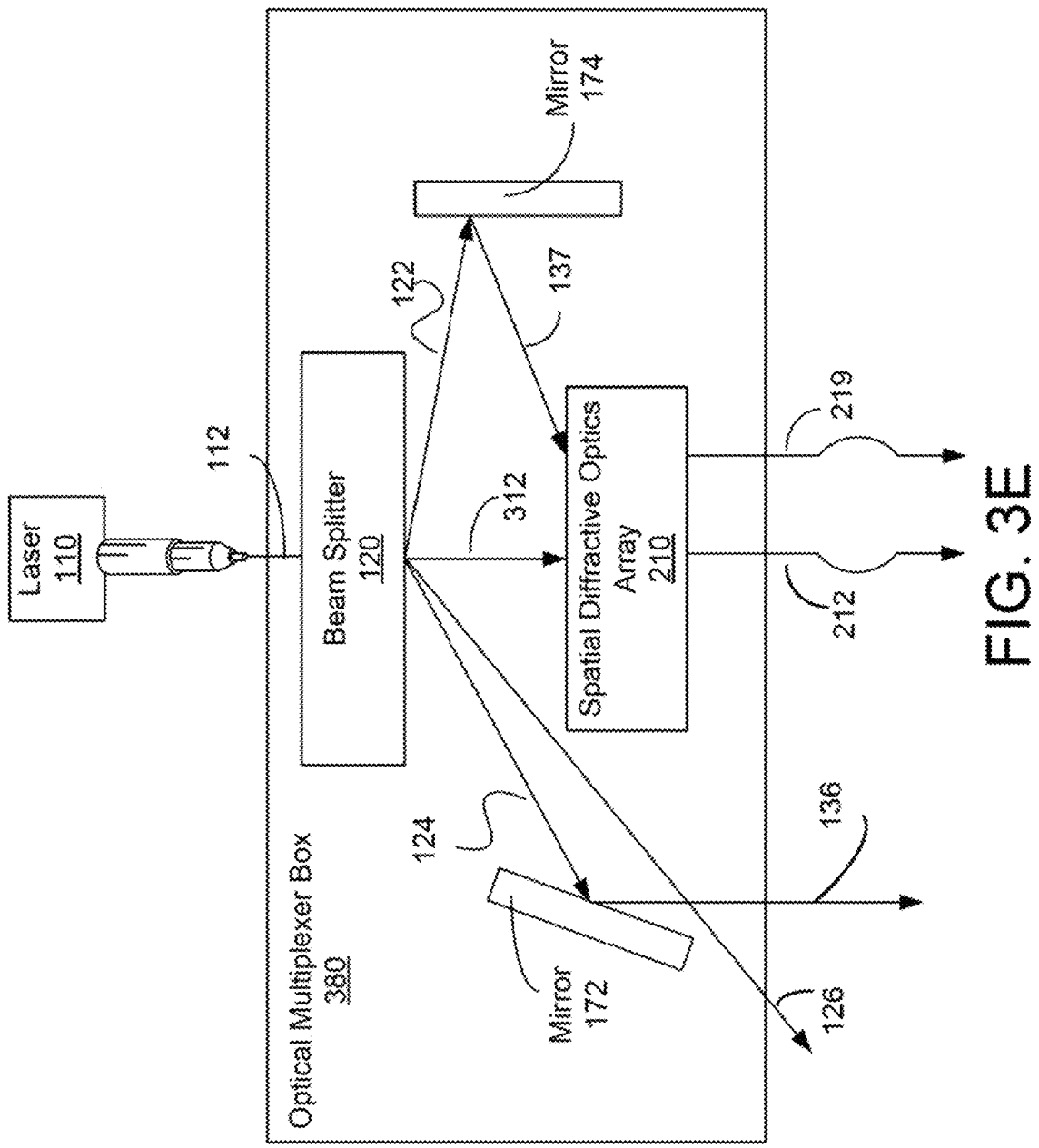

Referring now to FIG. 3E, system 300E is shown that operates substantially similar to that of FIG. 3D. In this embodiment, the mirrors 132 and 134 are replaced with mirrors 172 and 174 where each may include a plurality of mirrors, as discussed in system 100D discussed in FIG. 1D.

Referring now to FIG. 3F, system 300F is shown that operates substantially similar to that of FIG. 3E. In this embodiment, the mirrors 172 and 174 may be controlled using the control signals 141-148, similar to system 100E discussed in FIG. 1E.

Figure 4:
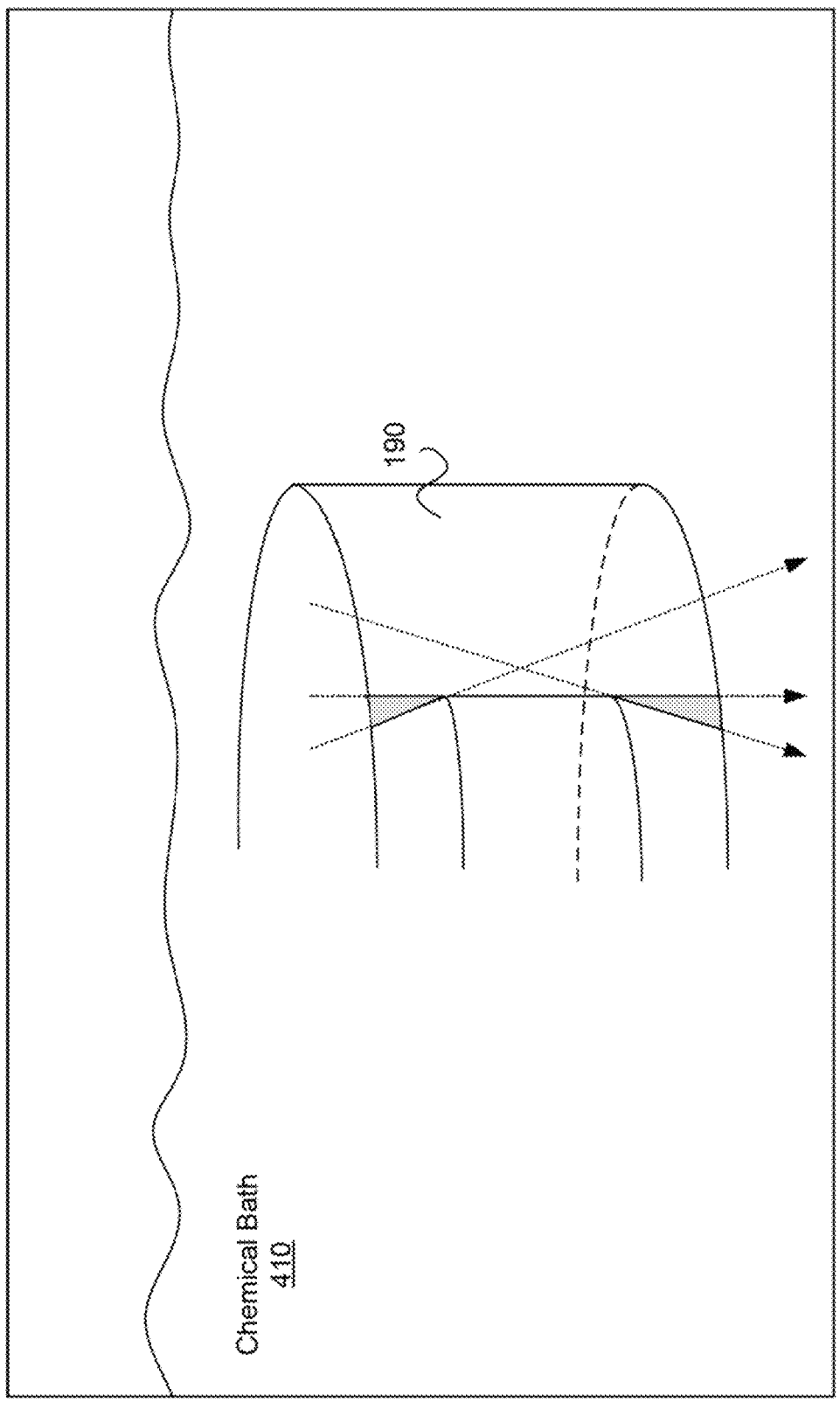
FIG. 4 shows a system including an optical multiplexer box configured to chemically alter a glass substrate into a shape defined by the chemical alteration according to one aspect of the present embodiments.

Referring now to FIG. 4, a system including an optical multiplexer box configured to chemically alter a glass substrate into a shape defined by the chemical alteration according to one aspect of the present embodiments is shown. It is appreciated that a system including an optical multiplexer box, as discussed with respect to FIGS. 1A-3F, may be used to chemically alter the glass substrate into a shape defined by the chemical alteration rather than cut the glass substrate. In other words, the output of the optical multiplexer box may focus the emitted laser beams onto the glass substrate 190 in order to alter the chemical properties of the glass substrate where the laser beam is focused. The chemical alteration delineates a desired cut/shape within the transparent glass substrate. Once the glass substrate 190 is placed in a chemical bath 410, e.g., Potassium Hydroxide (KOH)~1 um/s with selectivity of 350, Sodium Hydroxide (NaOH), Hydrofluoric acid (HF)~1 um/s with selectivity of 100, etc., the glass substrate 190 separates according to the shape defined by the chemical alteration. For example, in the embodiment shown in FIG. 4, the glass substrate 190 separates at positioned on the glass substrate 190 where the laser beam was focused. Thus, the glass substrate may be formed and shaped without using mechanical cutting and grinding.

Figure 5:
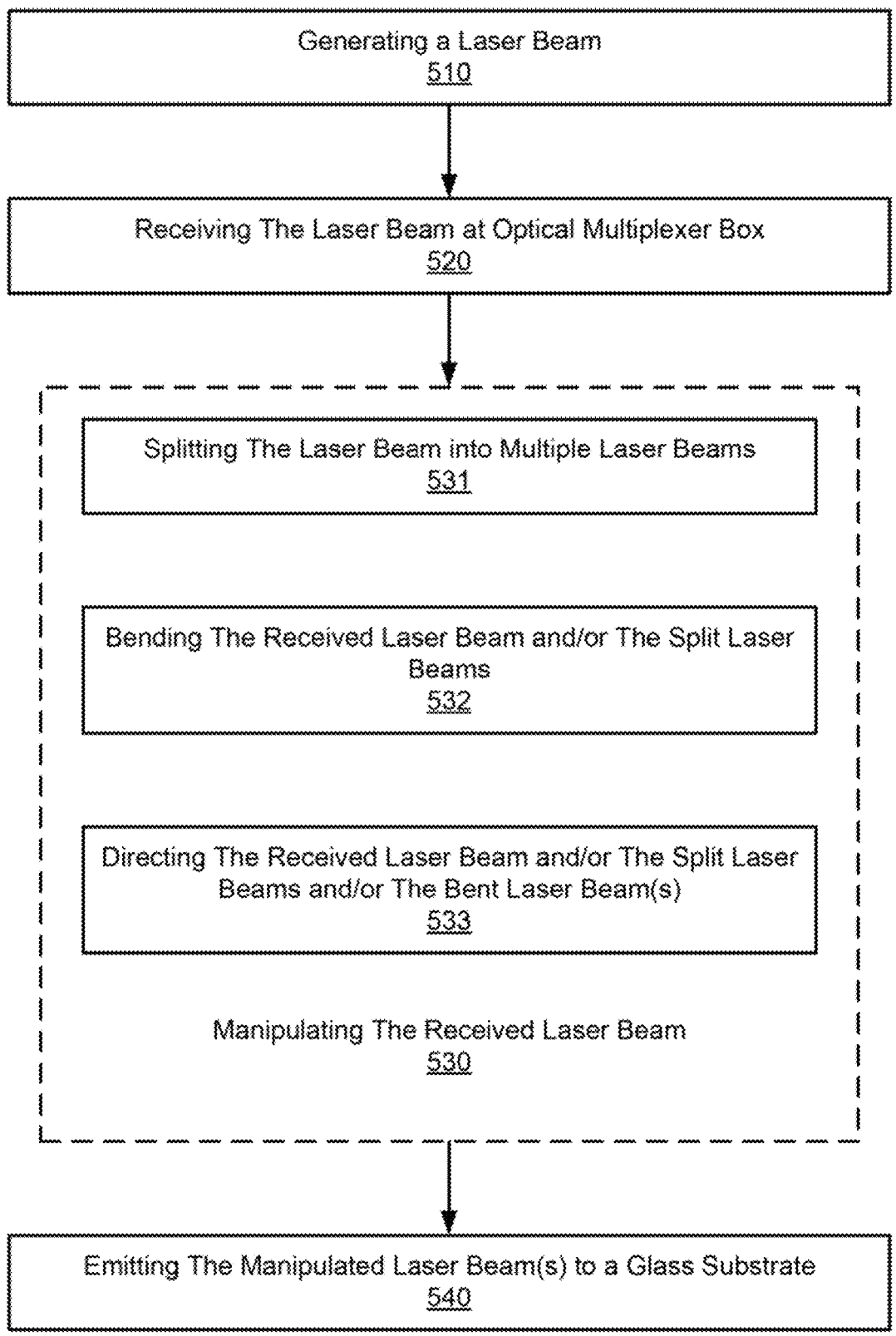
FIG. 5 shows an exemplary flow diagram in accordance with one aspect of the present embodiments.

Referring now to FIG. 5, a flow diagram in accordance with one aspect of the present embodiments is shown. At step 510, a laser beam is generated, e.g., by a laser source. At step 520, the generated laser beam is received by the optical multiplexer box 520, e.g., as described in FIGS. 1A-4. The optical multiplexer box 520 may manipulate the received laser beam, in step 530, as described in FIGS. 1A-4. For example, at step 531, the laser beam may be split into multiple laser beams, e.g., using a beam splitter. At step 532, the received laser beam or one or more of the split laser beams may be bent, e.g., using spatial diffractive optics array. In some embodiments, at step 533, the received laser beam and/or the split laser beam(s) and/or the bent laser beam(s) may be directed, e.g., using one or mirrors. It is appreciated that the mirrors may be controlled using one or more control signals, as described above. At step 540, the manipulated laser beam(s) is emitted from the optical multiplexer box 520 onto a glass substrate. As such, the glass substrate may be cut and shaped without using mechanical cutting and grinding. Moreover, the glass substrate may be cut and shaped simultaneously. Furthermore, it is appreciated that in some embodiments, the optical multiplexer box may chemically alter the glass substrate into a shape defined by the chemical alteration rather than cut the glass substrate. In other words, the output of the optical multiplexer box may focus the emitted laser beams onto the glass substrate in order to alter the chemical properties of the glass substrate where the laser beam is focused. The chemical alteration delineates a desired cut/shape within the transparent glass substrate. Once the glass substrate is placed in a chemical bath, e.g., Aqueous solutions of Potassium Hydroxide (KOH) (concentrations of 5-20 mol/(dm)3, Sodium Hydroxide (NaOH) (concentrations of 5-20 mol/(dm)3), Hydrofluoric acid (HF) (concentrations of 1-10%), Muriatic acid (HCL) (concentrations of 10-80%). Bath times (5 min-100 min) and etch rates (1 um/min up to 20 um/min) can be adjusted by varying the chemical bath concentrations, bath temperature (between 20 and 90 degree Celsius), etc., the glass substrate 190 separates according to the shape defined by the chemical alteration. Further enhancement of etch rates can be achieved by applying ultrasonic or megasonic waves to the chemical bath. Thus, the glass substrate may be formed and shaped without using mechanical cutting and grinding.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. An apparatus comprising:
   a beam splitter positioned to receive a laser beam from a source and split the received laser beam into at least a first split laser beam and a second split laser beam; and
   a spatial diffractive optics array configured to:
   receive the first split laser beam and the second beam from the beam splitter;
   bend the first split laser beam in a first direction; and
   bend the second split laser beam in a second different direction; and
   direct the bent first laser beam and the bent second laser beam onto a glass substrate to expose a new surface and to shape the newly-exposed surface of the glass substrate, the first split laser beam generating a convex profile in each of two opposing edge regions of the newly-exposed surface and the second split laser beam generating a concave profile in a center region of the newly-exposed surface between the opposing edge regions.

2. The apparatus of claim 1, wherein the bent first laser beam and the bent second laser beam simultaneously shape the glass substrate.

3. The apparatus of claim 1, further comprising:
   a plurality of mirrors positioned to direct the first laser beam and further configured to direct the second laser beam.

4. The apparatus of claim 3, wherein the beam splitter is further positioned to receive another laser beam from the source and wherein the beam splitter is further configured to split the received another laser beam into a third split laser beam, wherein the third split laser beam is emitted onto the glass substrate without being directed by the plurality of mirrors.

5. The apparatus of claim 3, wherein the plurality of mirrors is controllable with a plurality of control signals, wherein a mirror within the plurality of mirrors mechanically moves responsive to a control signal of the plurality of control signals, wherein the mirror moving changes angle of incident of a split laser beam, and wherein the mirror moving changes angle of reflection corresponding to the angle of incident of the split laser beam.

6. The apparatus of claim 1, wherein the spatial diffractive optics array is selected from a group consisting of Gaussian, Bessel, and Airy.

7. A system comprising:
a laser source; and
an optical multiplexer box that receives a laser beam from the laser source and wherein the optical multiplexer box is further configured to:
manipulate the received laser beam to form a first laser beam bent in a first direction and a second laser beam bent in a second opposite direction; and
direct the bent first laser beam and the bent second laser beam onto an optical glass substrate to expose a new surface and to simultaneously shape the newly-exposed surface of the optical glass, the bent first laser beam generating a convex profile in each of two opposing edge regions of the newly-exposed surface and the bent second laser beam generating a concave profile in a center region between the opposing edge regions.

8. The system as described in claim 7, wherein the optical multiplexer box comprises:
a beam splitter positioned to receive the laser beam from the laser source and split the received laser beam to a first plurality of split laser beams and a second plurality of split laser beams; and
a plurality of mirrors configured to direct the first plurality of split laser beams and further configured to direct the second plurality of split laser beams, wherein the first plurality of split laser beams directed by the plurality of mirrors is configured to cut the glass substrate and wherein the second plurality of split laser beams directed by the plurality of mirrors is configured to shape the glass substrate.

9. The system of claim 8, wherein the plurality of mirrors is controllable with a plurality of control signals, wherein a mirror within the plurality of mirrors mechanically moves responsive to a control signal of the plurality of control signals, wherein the mirror moving changes angle of incident of a split laser beam of the first plurality of split laser beams or the second plurality of laser beams, and wherein the mirror moving changes angle of reflection corresponding to the angle of incident of the split laser beam of the first plurality of split laser beams or the second plurality of laser beams.

10. The system of claim 8 further comprising:
a spatial diffractive optics array positioned to receive a bendable laser beam from the beam splitter or from the plurality of mirrors, wherein the spatial diffractive optics array is configured to bend the bendable laser beam that cuts or shapes the glass substrate.

11. The system of claim 10, wherein the plurality of mirrors is controllable with a plurality of control signals, wherein a mirror within the plurality of mirrors mechanically moves responsive to a control signal of the plurality of control signals, wherein the mirror moving changes angle of incident of a split laser beam of the first plurality of split laser beams or the second plurality of laser beams, and wherein the mirror moving changes angle of reflection corresponding to the angle of incident of the split laser beam of the first plurality of split laser beams or the second plurality of laser beams.

12. The system of claim 8, wherein the glass substrate is a heat assisted media recording (HAMR) substrate of a disk drive.

13. The system of claim 7, wherein the optical multiplexer box includes a spatial diffractive optics array selected from a group consisting of Gaussian, Bessel, and Airy.

14. A method comprising:
positioning a beam splitter to receive a laser beam from a source and split the received laser beam into at least a first split laser beam and a second split laser beam; and
positioning a spatial diffractive optics array to:
receive the first split laser beam and the second beam from the beam splitter;
bend the first split laser beam in a first direction; and
bend the second split laser beam in a second different direction; and
direct the bent first laser beam and the bent second laser beam onto a glass substrate to expose a new surface and to shape the newly-exposed surface of the glass substrate, the bent first laser beam generating a convex profile in each of two opposing edge regions of the newly-exposed surface and the second bent laser beam generating a concave profile in a center region between the opposing edge regions.

15. The method of claim 14, wherein the beam splitter is further positioned to receive another laser beam from the source and wherein the beam splitter is further configured to split the received another laser beam into a third split laser beam, wherein the third split laser beam is emitted onto the glass substrate without being directed by the plurality of mirrors.

* * * * *